(12) United States Patent
Riddle et al.

(10) Patent No.: US 10,703,968 B2
(45) Date of Patent: Jul. 7, 2020

(54) HYDROGELS FOR ISOTOPIC NEUTRON EMITTERS AND ANTINEUTRINO DETECTION AND RELATED DETECTION SYSTEMS AND METHODS

(71) Applicant: Battelle Energy Alliance, LLC, Idaho Falls, ID (US)

(72) Inventors: Catherine Lynn Riddle, Idaho Falls, ID (US); Douglas W. Akers, Idaho Falls, ID (US); Dawn M. Scates, Idaho Falls, ID (US); Rick L. Demmer, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 15/890,837

(22) Filed: Feb. 7, 2018

(65) Prior Publication Data

US 2018/0223183 A1 Aug. 9, 2018

Related U.S. Application Data

(60) Provisional application No. 62/456,382, filed on Feb. 28, 2017.

(51) Int. Cl.
| | | |
|---|---|---|
| *C09K 11/02* | (2006.01) | |
| *C09K 11/61* | (2006.01) | |
| *C09K 11/06* | (2006.01) | |
| *G01T 3/06* | (2006.01) | |

(52) U.S. Cl.
CPC ............ *C09K 11/025* (2013.01); *C09K 11/06* (2013.01); *C09K 11/616* (2013.01); *G01T 3/06* (2013.01); *C09K 2211/10* (2013.01); *C09K 2211/182* (2013.01); *C09K 2211/185* (2013.01)

(58) Field of Classification Search
CPC ......... G01T 3/06; C09K 11/616; C09K 11/77; C09K 11/7727; C09K 221/10; C09K 221/182; C09K 221/185
See application file for complete search history.

(56) References Cited

U.S. PATENT DOCUMENTS 7,834,319 B2 * 11/2010 Muenchausen ...... C09K 11/025
250/361 R
9,505,977 B2 11/2016 Riddle et al.

FOREIGN PATENT DOCUMENTS

WO WO 2015/118533 * 8/2015

OTHER PUBLICATIONS

Machado et al, "X-ray scintillator Gd2O2S:Tb3+ materials obtained by a rapid andcost-effective microwave-assisted solid-state synthesis", Journal of Alloys and Compounds, 777 (2019), Nov. 2, 2018, pp. 638-645.*
Ovechkina et al, "Gadolinium laoded plastic scintillators for high efficiency neutron detction", Physics Procedia vol. 2 (2009), pp. 161-170.*
Ovechkina et al., "Gadolinium loaded plastic scintillators for high efficiency neutron detection", Physics Procedia, vol. 2 (3009) pp. 161-170.
Zaitseva et al., "Plastic scintillators with efficient neutron/gamma pulse shape discrimination", Nuclear Instruments and Methods in Physics Research vol. A 668 (2012) pp. 88-93.

* cited by examiner

*Primary Examiner* — C Melissa Koslow
(74) *Attorney, Agent, or Firm* — TraskBritt

(57) ABSTRACT

Scintillation compositions comprising a gadolinium compound and a scintillation compound in a polymer matrix precursor. The scintillation compound comprises strontium diiodide, fac-tris(2-phenylpyridine)iridium (Ir(ppy)$_3$), a quinine compound, or combinations thereof, or 2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof. Hydrogels comprising the gadolinium compound and scintillation compound in a polymer matrix are also disclosed, as are related systems and methods.

13 Claims, 3 Drawing Sheets

HYDROGELS FOR ISOTOPIC NEUTRON EMITTERS AND ANTINEUTRINO DETECTION AND RELATED DETECTION SYSTEMS AND METHODS

CROSS-REFERENCE TO RELATED APPLICATION

This application claims the benefit under 35 U.S.C. § 119(e) of U.S. Provisional Patent Application Ser. No. 62/456,382, filed Feb. 8, 2017, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates generally to radiation detection. More specifically, the disclosure, in various embodiments, relates to scintillation compositions and hydrogels formed from the scintillation compositions for the detection of neutron and antineutrino radiation, and to related methods and detection systems.

BACKGROUND

The security of our nation demands the ability to detect uranium or plutonium in cargo containers entering our borders and the ability to protect against the production of uranium or plutonium in foreign nuclear reactors. Nuclear reactor fuel rods contain the isotopes uranium-238 (U-238) and uranium-235 (U-235). Inside a reactor core, these isotopes absorb neutrons and undergo fission, producing antineutrinos with each decay. Some U-238 isotopes capture neutrons and decay into isotopes of plutonium-239, which also fission and emit antineutrinos. However, the decay of Pu-239 produces substantially fewer antineutrinos than does the decay of U-235 within the energy range required for detection. For a given fuel type, the degree of neutron irradiation primarily determines these changing amounts of fissile material, and is referred to as the "burnup." The fuel burnup at discharge directly relates to the amount of plutonium in spent fuel, and is an important parameter in the context of nuclear reactor safeguards. Over the course of a nuclear reactor's fuel cycle, the antineutrino count rate drops as uranium content decreases and plutonium increases. In addition, the antineutrino count rate is proportional to the fission rate of the isotopes and, thus, is approximately proportional to the nuclear reactor's power. Nuclear reactors are a major source of human-generated antineutrinos.

Improved detection of neutrons and antineutrinos is needed. For neutron detection, the growing shortage and increasing expense of helium-3 (He-3), which is a light, non-radioactive isotope of helium and the most important isotope in instrumentation for neutron detection, is problematic. He-3 is used in conventional neutron detectors because it has a large capture cross-section for neutrons. When a neutron meets a He-3 atom, they react to form tritium (H-3), which is an isotope of hydrogen with one proton, one electron, and two neutrons, and a hydrogen atom (1H, one proton and one electron), giving off energy in the process. The U.S. Department of National and Homeland Securities ensures the safety of our borders and ports against import of special nuclear material (SNM), such as highly enriched uranium and plutonium. Neutron detection has become increasing difficult because of the worldwide shortage of He-3 due to the nuclear arsenal drawdown at the end of the Cold War. In addition, neutron detection is difficult due to high levels of background noise, high detection rates, and the neutral charge and low neutron energy of the neutrons. There is an urgent need for new neutron detection technologies that have equivalent or higher efficiencies than He-3 in order to replace aging neutron detectors and develop new radiation monitors.

For antineutrino detection, there is also a need for new antineutrino detection technologies. Antineutrinos are electrically neutral, nearly massless fundamental particles produced in large numbers in the cores of nuclear reactors and in nuclear explosions. Because antineutrinos are inextricably linked to the process of nuclear fission, many applications of interest are in nuclear nonproliferation. The emitted antineutrino rate from reactors depends on the thermal power and fissile isotopic content of the reactor. The antineutrino rate can be used to measure the reactor operational status (on/off) and power continuously and in real time. If the reactor power and initial fuel loading are known by other means, and the antineutrino event rates are sufficiently high (roughly, hundreds or thousands of events per day or week), the antineutrino rate can be used to estimate the evolving amounts of fissile uranium and plutonium in the reactor core.

Conventional antineutrino detection technology in the form of liquid scintillation materials has the same drawbacks as with neutron detection, only on a larger scale. Antineutrino detectors are large volume liquid tanks with hazardous and flammable compounds, such as toluene and xylene as well as export controlled and toxic components such as lithium-6 (Li-6). Antineutrino liquid scintillators, like neutron detection scintillators, have issues with regard to size, quantum efficiency, stability, and spatial resolution for the detection area.

Conventional scintillator materials include crystalline materials, plastic materials, or liquid materials. Conventional crystalline scintillator materials, such as $LaBr_3$, $CeBr_3$, or $Cs_2LiYCl_6$.Ce (CLYC), are fragile and rather hygroscopic. Conventional crystalline scintillator materials also have high manufacturing costs and size restrictions, lengthy production times to grown the crystals, and are formed from export controlled compounds such as Li-6 and B-10. Conventional plastic scintillator materials suffer from low efficiencies, dead areas due to non-homogeneously distributed components, and low light yields. Conventional liquid scintillator materials contain hazardous, flammable, and toxic materials that can breach and leak, causing a danger to the environment and humans. These properties make crystalline, liquid, and plastic scintillator materials undesirable as a direct replacement for 3He neutron detectors and liquid scintillation antineutrino detectors.

BRIEF SUMMARY

An embodiment of the disclosure comprises a scintillation composition comprising a gadolinium compound and a scintillation compound in a polymer matrix precursor. The scintillation compound comprises strontium diiodide, fac-tris(2-phenylpyridine)iridium ($Ir(ppy)_3$), a quinine compound, or combinations thereof, or 2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof.

Another embodiment of the disclosures comprises a hydrogel comprising a gadolinium compound and a scintillation compound in a polymer matrix. The gadolinium compound and the scintillation compound are as discussed above.

Yet another embodiment of the disclosure comprises a detection system comprising an enclosure, at least one photomultiplier tube, and a hydrogel in proximity to the at least one photomultiplier tube, the hydrogel of the detection system configured to detect neutron or antineutrino radiation. The hydrogel is as described above.

Yet still another embodiment of the disclosure comprises a method of detecting radiation emitting from an article. The method comprises interacting neutrons or antineutrinos emitted from an article with a hydrogel of a detection system and detecting the neutrons or antineutrinos. The hydrogel is as described above.

DETAILED DESCRIPTION

Figure 1:
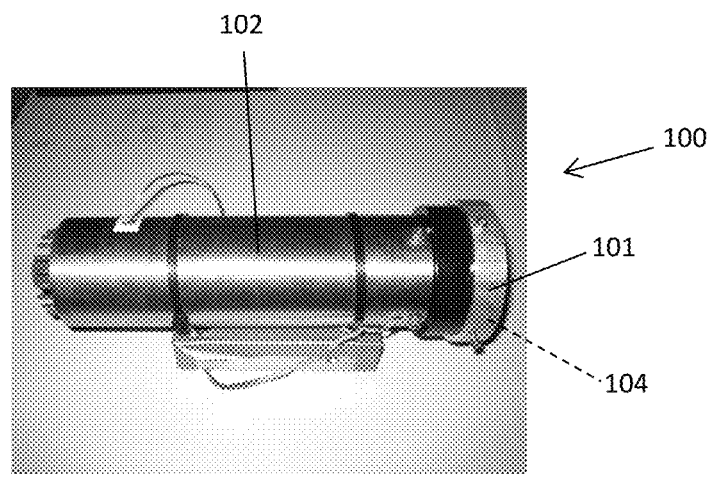
FIG. 1 is a photograph of a photomultiplier tube (PMT) detection system including a hydrogel according to embodiments of the disclosure and configured to detect at least one of neutrons or antineutrinos.

Scintillation compositions for neutron and antineutrino detection, hydrogels produced from the scintillation compositions, and related detection systems that include the hydrogels are disclosed. Methods of detecting neutrons and antineutrinos are also disclosed. The hydrogels produced from the scintillation compositions may be used to detect plutonium-239 ($^{239}$Pu), uranium-233 ($^{233}$U), or uranium-235 ($^{235}$U), which emit neutrons and gamma rays. The hydrogels produced from the scintillation compositions may also be used to detect uranium-238 ($^{238}$U) or uranium-235 ($^{235}$U), which absorb neutrons and undergo fission, producing antineutrinos with each emission. Some $^{238}$U isotopes capture neutrons and decay into isotopes of plutonium-239 ($^{239}$Pu), which also fission and emit antineutrinos. The scintillation compositions and hydrogels of embodiments of the disclosure are low cost, high performance, simple and quick to manufacture, and environmentally friendly for deployment both domestically and around the world. The scintillation compositions may be used as a direct replacement, with minimal retrofit, for conventional scintillators in He-3 neutron detectors and for liquid scintillators for antineutrino detection. Use of the scintillation compositions and hydrogels of the disclosure may enable wide spread protection against the importing of nuclear material and weapons.

As used herein, the term "scintillation composition" means and includes a composition formulated to detect neutron or antineutrino radiation and refers to the components before a polymerization process is conducted. The scintillation composition includes a gadolinium compound, a scintillation compound, and a polymer matrix precursor. The scintillation composition includes additional components depending on the radiation (e.g., neutron or antineutrino) to be detected. The gadolinium compound, the scintillation compound, and any additional components are homogeneously dispersed in the polymer matrix precursor. The scintillation composition is formulated to produce a hydrogel upon polymerization of the polymer matrix precursor, with the gadolinium compound and the scintillation compound homogeneously dispersed throughout the polymer matrix of the hydrogel. The components of the scintillation composition are selected to produce an optically transparent and stable hydrogel. By forming the scintillation composition into a hydrogel, the scintillation composition exhibits properties of both liquid and solid (e.g., crystalline, plastic) scintillators without many of the disadvantages associated with these scintillators.

As used herein, the term "hydrogel" means and includes a three-dimensional network of polymer chains formed by polymerization of the polymer matrix precursor of the scintillation composition and having the gadolinium compound and the scintillation compound homogeneously dispersed in the polymerized polymer matrix precursor. The polymer matrix precursor is referred to as a polymer matrix following polymerization. The three-dimensional network of polymer chains is hydrophilic and capable of holding water. The hydrogel produced from the scintillation composition is optically transparent and stable. The hydrogel may be an organic gel that includes the gadolinium compound, scintillation compound, and polymerized polymer matrix precursor (e.g., polymer matrix).

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of embodiments of the disclosure and such term is used in preference to the more restrictive term "is" so as to avoid any implication that other, compatible materials, structures, features and methods usable in combination therewith should or must be, excluded.

The gadolinium compound may include a compound of gadolinium-155 or gadolinium-157 and may be an organic compound or an inorganic compound. The gadolinium compound functions in the scintillation composition as a neutron capture component. The gadolinium compound may exhibit a high neutron capture cross section and a high solubility in polar and non-polar solvents, such as in water. The increased solubility of the gadolinium compound increases the amount (e.g., loading) of gadolinium in the resulting hydrogel, increasing the neutron capture ability and the neutrons produced from antineutrino reactions. The gadolinium compound may include, but is not limited to, diethylenetriaminepentaacetic acid gadolinium(III) ((Gd-DTPA).xH$_2$O) where x is an integer, gadolinium(III) nitrate (Gd(NO$_3$)$_3$.6H$_2$O), gadolinium(III) sulfate (Gd$_2$(SO$_4$)$_3$), terbium-doped gadolinium oxysulfide (Gd$_2$O$_2$S:Tb$^{3+}$), terbium-doped gadolinium oxide (Gd$_2$O$_3$:Tb$^{3+}$), gadolinium tris-tetra-methyl-heptanedionate, or combinations thereof. The gadolinium compound may include a crystalline, rare earth element besides terbium as the dopant. The rare earth element may include, but is not limited to, cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), thulium (Tm), ytterbium (Yb), yttrium (Y), a combination thereof, or a combination with terbium (Tb). The chemical structures of Gd-DTPA, $Gd_2O_2S$:Tb, and gadolinium tris-tetra-methyl-heptanedionate, respectively, are shown below:

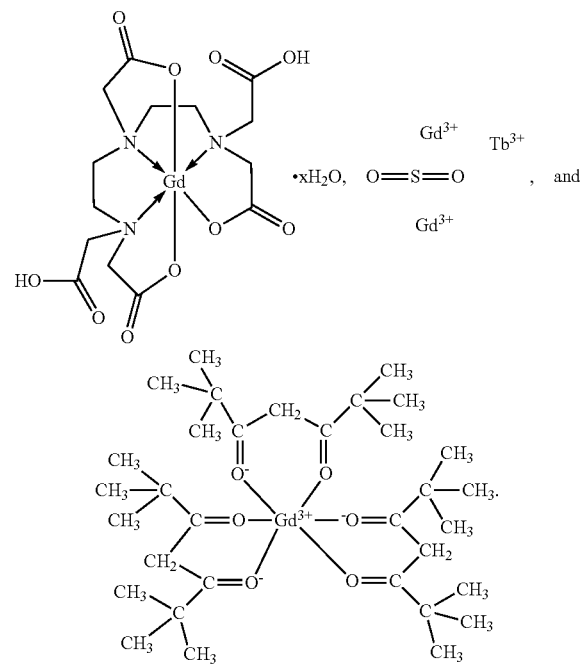

The gadolinium compound may be commercially available from numerous sources, such as Sigma Aldrich Chemical Co. (St. Louis, Mo.), or may be produced by conventional techniques, which are not described in detail herein. By way of example only, for a gadolinium compound including a rare earth element, the rare earth element dopant may be incorporated into the gadolinium compound. To produce, for example, $Gd_2O_3$:$Tb^{3+}$, chloride precursors and sodium hydroxide precursors may be used.

The gadolinium compound may be present in the scintillation composition at a loading of gadolinium of from about 5% by weight/volume to about 20% by weight/volume, such as from about 5% by weight/volume to about 15% by weight/volume. The gadolinium compound may account for from about 5% by weight/volume to about 20% by weight/volume of the hydrogel produced from the scintillation composition, such as from about 5% by weight/volume to about 15% by weight/volume of the hydrogel. By way of example only, if the gadolinium compound is Gd-DTPA, the Gd-DTPA may account for from about 11% by weight/volume to about 15% by weight/volume of the hydrogel produced from the scintillation composition. If the gadolinium compound is $Gd_2O_2S$:Tb or gadolinium tris-tetra-methyl-heptanedionate, the $Gd_2O_2S$:Tb or gadolinium tris-tetra-methyl-heptanedionate may account for from about 5% by weight/volume to about 10% by weight/volume of the hydrogel produced from the scintillation composition. In comparison, conventional crystalline, liquid, or plastic scintillators that include gadolinium complexes have a maximum gadolinium loading of between about 3% by weight/volume and about 4% by weight/volume. The increased maximum gadolinium loading of up to about 20% by weight/volume and the increased neutron capture enables the scintillation composition of the disclosure to exhibit a larger neutron capture cross section than conventional scintillators. The gadolinium compound in the scintillation composition reduces neutron capture time from about 200 ns to about 30 ns, providing a much tighter time signature and commensurate reduction in uncorrelated background. In addition, the neutron capture of the gadolinium compound may produces a shower of gamma rays with a total energy of close to 8 MeV, significantly higher than the 2.2 MeV gamma rays that result from neutron capture on protons.

In some embodiments, the gadolinium compound is Gd-DTPA. Gd-DTPA exhibits a high neutron capture cross section and is soluble in water at a concentration range of from about 40 mg/ml to about 60 mg/ml. The emission range for Gd-DTPA is between about 430 nm and about 450 nm. Furthermore, the neutron capture on Gd-DTPA produces a shower of gamma rays with a total energy of close to 8 MeV, significantly higher than the 2.2 MeV gamma rays that result from neutron capture on protons. In other embodiments, the gadolinium compound is terbium-doped gadolinium oxide ($Gd_2O_3$:$Tb^{3+}$). The emission range for $Gd_2O_3$:$Tb^{3+}$ is between about 470 nm and about 640 nm, with the largest emission at about 545 nm, providing a higher light yield compared to Gd-DTPA.

The scintillation compound may be selected depending on the radiation to be detected. The scintillation compound may be a water soluble scintillation compound if neutrons are to be detected, or a proton-rich scintillation compound if antineutrinos are to be detected. Depending on the radiation to be detected, the scintillation compound functions in the scintillation composition as a gamma capture component or as a scintillation fluorescent component. The water soluble scintillation compound may be strontium diiodide:europium ($SrI_2$(Eu)), iridium complex (fac-tris(2-phenylpyridine) iridium (Ir(ppy)$_3$) or other OLED compound, a quinine compound, or combinations thereof. The chemical structures of $SrI_2$(Eu) and Ir(ppy)$_3$, respectively, are shown below:

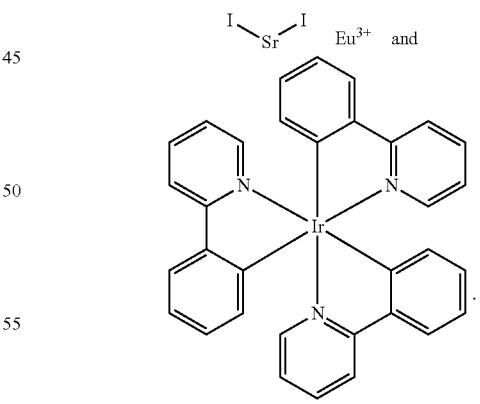

While other europium-doped strontium halides, such as a strontium chloride or a strontium bromide, may be used, the $SrI_2$(Eu) may exhibit higher light yields than the other europium-doped strontium halides. As known in the art, $SrI_2$(Eu) includes strontium diiodide doped with europium, with the europium present at from about 1% by weight/volume to about 8% by weight/volume, such as about 5% by weight/volume. The water soluble scintillation compound may exhibit high detection efficiency that matches or exceeds other neutron scintillators.

In some embodiments, the water soluble scintillation compound is $SrI_2(Eu)$, which has a light yield for incoming gamma-rays at approximately $11E^4$ ph/MeV in a wavelength of from about 300 nm to about 400 nm. The high light yield of $SrI_2(Eu)$ indicates a high detection efficiency that matches or exceeds other neutron detectors. For a 100 ml volume of hydrogel material, from about 70 mg to about 150 mg of the $SrI_2(Eu)$ may be used.

In some embodiments, the water soluble scintillation compound is $Ir(ppy)_3$, which is a phosphorescent organic light emitting diode (OLED) that uses the principle of electrophosphorescence to convert electrical energy into light in a highly efficient manner. For a 100 ml volume of hydrogel material, from about 65 mg to about 200 mg of the $Ir(ppy)_3$ may be used.

The proton-rich scintillation compound may include, but is not limited to, 2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof. The proton-rich scintillation compound may capture the lower range of light emission followed by a secondary light emission in the range acceptable for PMT detection. In some embodiments, the proton-rich scintillation compound is b-PBD, PPO, or POPOP. For a 100 ml volume of hydrogel material, from about 80 mg to about 120 mg of the b-PBD may be used, from about 0.5 mg to about 1 mg of the PPO may be used, or from about 0.1 mg to about 0.5 mg of the POPOP may be used.

The polymer matrix precursor may be water soluble such that water soluble components, such as the gadolinium compound and the scintillation compound, of the scintillation composition are absorbed. The polymer matrix may be an organic material that is stable, non-toxic, and optically transparent when polymerized to form the hydrogel. The polymer matrix precursor may include, but is not limited to, an acrylic resin (e.g., an acrylic acid an alkylester, an ethyl, or a butyl ester), an acrylamide, bis-acrylamide, N,N-methylene bisacrylamide, poly(N-vinylcarbazole), a silicone (e.g., a polysiloxane), non-plasticizing silicone gel, two-part components of a polyurethane, a polyvinyl rigid polymer (e.g., a polyvinyl acetate, a polystyrene), or combinations thereof. By way of example only, an organic material may be used as the polymer matrix when the gadolinium compound is terbium-doped gadolinium oxide ($Gd_2O_3:Tb^{3+}$). Alternatively, a polysiloxane or a non-plasticizing silicone gel may be used as the polymer matrix when the gadolinium compound is Gd-DTPA. The polymer matrix precursor may also be selected in combination with the gadolinium compound and the scintillation compound to achieve a high light yield emission at a variety of different wavelengths. Since the polymer matrix precursor is water soluble, the gadolinium compound and scintillation compound may be homogeneously dispersed in the polymer matrix precursor during formulation of the scintillation composition. By dispersing the gadolinium compound and the scintillation compound in the polymer matrix, little or no scattering is observed when the hydrogel is used to detect radiation.

The scintillation composition may include additional components to initiate or catalyze polymerization of the polymer matrix precursor as known in the art. By way of example only, if an acrylamide is used as the polymer matrix precursor, ammonium persulfate and N,N,N',N'-tetramethylethylenediamine (TEMED) may be used to polymerize the acrylamide. The ratio of the acrylamide to the ammonium persulfate and TEMED may be adjusted depending on the desired rigidity, strength, and stability of the resulting hydrogel. If other materials are used as the polymer matrix precursor, the additional components to initiate or catalyze polymerization may be selected to produce the desired rigidity, strength, and stability of the resulting hydrogel.

By way of example only, the scintillation composition may include as an optional component a fluorophore for enhancement of light yield depending on the type of radiation to be detected. However, if the scintillation composition includes a scintillation compound that provides a high light yield, the scintillation composition may be substantially free of a fluorophore, which reduces the cost of the scintillation composition while still providing enhancement of the light yield.

The scintillation composition may be produced by combining the components at ambient (room) temperature, such as from about 20° C. to about 25° C., and ambient pressure for an amount of time ranging from about 0.5 minute to about 30 minutes, such as from about 0.5 minute to about 5 minutes. Thus, the scintillation composition may be easily and quickly produced. The scintillation composition may be a homogeneous mixture since the components are water soluble and remain water soluble during the polymerization of the scintillation composition into the hydrogel. All of the components except for the polymer matrix precursor and initiators/catalysts may be combined with mixing, followed by the addition of the polymer matrix precursor and initiators/catalysts to initiate the polymerization of the scintillation composition. Once formulated, the scintillation composition may be poured into a mold and polymerized, producing the hydrogel. The mold, such as an acrylic mold, may exhibit a desired shape and size to produce the hydrogel to be used in a conventional detector. The shape of the mold may be configured to accommodate size or shape restrictions for the detector, which depends on the type of radiation to be detected. Following a sufficient amount of time for the polymer matrix precursor to polymerize, the scintillation composition may be solidified into the hydrogel, which is removed from the mold. The resulting hydrogel may be optically transparent and sufficiently rigid to maintain its shape after release from the mold. The hydrogel may also exhibit sufficient mechanical strength and stability to remain intact when dropped, e.g., from a distance of about three feet. Thus, the hydrogel exhibits desirable properties of crystalline and plastic materials. Depending on the polymer matrix precursor used, the scintillation composition may polymerize into the hydrogel in an amount of time ranging from about 0.5 minutes to about 60 minutes. The polymerization time may also vary depending on whether water or an organic solvent is present in the scintillation composition. However, the hydrogel may be easily and quickly produced from the scintillation composition. In contrast, conventional crystalline scintillation materials are grown and, therefore, longer amounts of time are needed for their production. Crystalline scintillation materials are also more fragile than the hydrogels of the disclosure.

The hydrogels of the disclosure may be used to detect nuclear reactions and/or nuclear materials. For example, the hydrogels may be used in detectors (e.g., a neutron detector or an antineutrino detector) that detect radiation particles. The hydrogels of the disclosure may be used in many applications, including national and homeland security, industry, medical, and science. By way of example only, the hydrogels of the disclosure may be used to monitor known special nuclear material to ensure its security and ensure that the special nuclear material is fully accounted for, such as monitoring of vehicles and cargo containers at ports and border crossings (domestic and international) for the presence of radioactive material. Specific applications for the hydrogel include, but are not limited to, medical imaging, health physics, security uses for the Transportation Security Administration (TSA), High Energy Physics (HEP) for particle and photon imaging, geological survey for uranium and thorium via spectroscopy, mineral exploration, oil industry (density, spectroscopy), or space exploration.

The hydrogels of the disclosure are a hybrid between a crystalline, liquid, and plastic scintillator material, incorporating desirable properties of conventional scintillators without incurring many of the disadvantages. The hydrogels are formulated to exhibit properties of crystalline, liquid, and plastic scintillators, which enables more efficient, stable, and safer operation of the detection systems for neutron and antineutrino detection. By way of example only, the hydrogels are more robust and have greater mechanical stability than conventional solid (e.g., crystalline or plastic) scintillator materials. The hydrogels also exhibit the internal structure of a crystalline scintillator material and do not have dead voids, as is common with conventional plastic scintillator materials. The hydrogels also retain the hydrogen properties of a conventional liquid scintillator material. Since the hydrogels are formed from a water soluble composition, the gadolinium compound and scintillation compound may be homogeneously dispersed in the hydrogels of the disclosure, unlike with conventional plastic scintillator materials. In addition, the hydrogels of the disclosure are formed from non-hazardous or non-toxic components and, therefore, are safer and more environmentally friendly to make than conventional plastic scintillator materials. The scintillation compositions that are used to produce the hydrogels of the disclosure may also be easily and quickly formed, reducing the production time and expense of the hydrogels.

The hydrogels of the disclosure are mobile (e.g., transportable), compact, robust, and low-maintenance. Most importantly, the hydrogels are not sensitive to background radiation, leading to high neutron/gamma discrimination for a neutrino detection scintillation composition and high antineutrino conversion for an antineutrino detection scintillation composition. The hydrogels formed from the scintillation composition have higher detection efficiencies than conventional liquid and plastic scintillators, which provides decreased response time and quicker processing whether it is cargo scanning or nuclear reactor monitoring for SNM production. In some embodiments, the scintillation compound comprises Ir(ppy)$_3$ and the gadolinium compound comprises Gd-DTPA.xH$_2$O. In other embodiments, the scintillation compound comprises 2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof, and the gadolinium compound comprises Gd-DTPA.xH$_2$O. In yet other embodiments, the polymer matrix comprises polyacrylamide, the gadolinium compound comprises diethylenetriaminepentaacetic acid gadolinium(III) or Gd$_2$O$_3$:Tb$^{3+}$, and the scintillation compound comprises strontium diiodide homogeneously dispersed in the polyacrylamide. In still yet other embodiments, the polymer matrix comprises polyacrylamide, the gadolinium compound comprises diethylenetriaminepentaacetic acid gadolinium(III) or Gd$_2$O$_3$:Tb$^{3+}$, and the scintillation compound comprises 2-(4-biphenylyl)-5 phenyl-1,3,4-oxadiazole (PBD), 2-(4-tert-butylphenyl)-5-(4-phenylphenyl)-1,3,4-oxadiazole (butyl-PBD), 2,5-diphenyl oxazole (PPO), 1,4-bis(5-phenyloxazol-2-yl) benzene (POPOP), or combinations thereof homogeneously dispersed in the polyacrylamide.

In some embodiments, the scintillation composition is used to detect neutrons and is referred to herein as a neutron detection scintillation composition. The neutron detection scintillation composition includes Gd-DTPA as the gadolinium compound, SrI$_2$(Eu) as the water soluble scintillation compound, and acrylamide as the polymer matrix precursor. The Gd-DTPA is present in the neutron detection scintillation composition at a maximum loading of gadolinium of about 15% by weight/volume. With its high gadolinium loading and high neutron capture cross section, the Gd-DTPA enables the neutron detection scintillation composition to exhibit a larger neutron capture cross section than conventional scintillators. Having the higher gadolinium loading in the hydrogel produced from the neutron detection scintillation composition, which is not possible in conventional scintillators, offers the opportunity for a large neutron capture cross section (Gd=$2.55 \times 10^5$ barns) compared to He-3 ($5.33 \times 10^3$ barns) for conventional liquid scintillators, reducing neutron capture times as well as supporting higher Cerenkov light yields (thousands of photons per MeV (ph/MeV) compared to tens of photons per MeV for conventional scintillators). Therefore, the hydrogel produced from the neutron detection scintillation composition provides better energy resolution.

By using SrI$_2$(Eu) as the scintillation compound, the neutron detection scintillation composition is substantially free of a fluorophore dye for enhancement of light yield since SrI$_2$(Eu) exhibits a light yield for incoming gamma rays at approximately $11 \times 10^4$ ph/MeV in a wavelength of from about 300 nm to about 400 nm. Therefore, the cost of the neutron detection scintillation composition may be reduced while still providing enhancement of the light yield. However, the neutron detection scintillation composition may optionally include a fluorophore in combination with a non-fluorophore compound in order to maximize the light yield during neutron/gamma detection.

The hydrogel is produced from the neutron detection scintillation composition by polymerizing the polymer matrix precursor. Once polymerized, the components of the neutron detection scintillation composition may be homogeneously dispersed in the resulting hydrogel. A higher concentration of gadolinium may be present in the hydrogel than may be present in conventional crystalline, liquid, or plastic scintillators due to the higher gadolinium loading in the neutron detection scintillation composition. The resulting hydrogel does not exhibit the disadvantages of conventional He-3 replacement technologies because the neutron detection scintillation composition takes advantage of the dispersion, gadolinium loading, and gelling properties of the polymer matrix precursor. In addition, the SrI$_2$(Eu) and Gd-DTPA form an emulsion in the polymer matrix precursor that creates a matrix having the desirable properties of crystalline, liquid and plastic scintillators. The resulting hydrogel may be used in conventional He-3 neutron detector systems with minimal retrofit and yields high resolution gamma-ray detection because of the high light output. Using the hydrogel produced from the neutron detection scintillation composition is expected to replace dwindling supplies of He-3 for use in compact neutron detectors, enabling the continuous, non-intrusive, unattended measurements suitable for the United States Department of National and Homeland Security deployment to spot neutron emissions, such as from shipping containers housing smuggled plutonium.

The neutron detection scintillation composition may be poured into a mold, such as an acrylic mold, having a desired shape and size. The shape of the mold may be configured to accommodate the size or shape restrictions for the type of conventional He-3 neutron detector system to be used. Following a sufficient amount of time for the acrylamide to polymerize, the neutron detection scintillation composition may be solidified into the hydrogel and removed from the mold. When acrylamide is used as the polymer matrix precursor, the neutron detection scintillation composition may polymerize into the hydrogel in about 1 minute or less. Thus, the hydrogel may be easily and quickly produced from the neutron detection scintillation composition.

In some embodiments, the scintillation composition is used for antineutrino detection and is referred to herein as an antineutrino detection scintillation composition. The antineutrino detection scintillation composition includes Gd-DTPA as the gadolinium compound, PBD, b-PBD, PPO, or POPOP as the at least one proton-rich scintillation compound, and acrylamide as the polymer matrix precursor. The antineutrino detection scintillation composition also includes at least one of a primary fluorophore or a secondary fluorophore to provide a high light yield. By way of example only, the fluorophore is a water soluble fluorophore, such as those commercially available from Risk Reactor, Inc. (Santa Ana, Calif.). A hydrogel produced from the antineutrino detection scintillation composition is a hybrid between a liquid and a plastic, and contains an optically transparent emulsion of the fluorophore in a water suspension.

The Gd-DTPA is present in the antineutrino detection scintillation composition at a maximum gadolinium loading of about 15% by weight/volume. The Gd-DTPA induces inverse beta-decay interactions during use and operation of the hydrogel formed from the antineutrino detection scintillation composition. The PBD, b-PBD, PPO, or POPOP provides the reactor antineutrino protons to collide with during use and operation of the hydrogel, producing a positron and a neutron followed by a flash of light. Therefore, the antineutrino detection scintillation composition has higher Cerenkov light yields (thousands of photons per MeV compared to tens of photons per MeV for a conventional, water-based gel emulsion) that give the resulting hydrogel better energy resolution, antineutrino capture ability, and high light production. The fluorophore in the antineutrino detection scintillation composition captures the lower range of light emission followed by a secondary light emission in the range acceptable for PMT detection.

The hydrogel is produced from the antineutrino detection scintillation composition by polymerizing the polymer matrix precursor. Since the components of the antineutrino detection scintillation composition are water soluble, the components may be homogeneously dispersed in the hydrogel. A higher concentration of gadolinium may be present in the resulting hydrogel than may be present in conventional crystal, liquid, or plastic scintillators due to the higher gadolinium loading in the antineutrino detection scintillation composition.

The antineutrino detection scintillation composition may be poured into a mold, such as an acrylic mold, having a desired shape and size. The shape of the mold may be configured to accommodate the size or shape restrictions for the type of conventional antineutrino detector system to be used. Following a sufficient amount of time for the acrylamide to polymerize, the antineutrino detection scintillation composition may be solidified into the hydrogel and removed from the mold. When acrylamide is used as the polymer matrix precursor, the antineutrino detection scintillation composition may polymerize into the hydrogel in from about 30 minutes to about 60 minutes. Thus, the hydrogel may be easily and quickly produced from the antineutrino detection scintillation composition.

The hydrogel produced from the antineutrino detection scintillation composition is advantageous compared to conventional liquid scintillators used in antineutrino detection due to its ability to be compact, mobile, non-flammable, and environmentally friendly as well as having high light yield and resolution. Conventional antineutrino detectors that are compact, e.g., having a 1 $m^3$ or less active volume, have issues with liquid scintillators with regard to size, quantum efficiency, stability, and spatial resolution for the detection area. The hydrogel produced from the antineutrino detection scintillation composition addresses these problems by using a stable gel material with an efficient neutron capture agent found in gadolinium (Gd) containing coordination compounds. Use of the hydrogel produced from the antineutrino detection scintillation composition in compact antineutrino detectors provide continuous, non-intrusive, unattended measurements suitable for IAEA and other reactor safeguards assessments.

The ability to detect antineutrinos provides the hydrogel produced from the antineutrino detection scintillation composition the potential to act as a failsafe check for normal reactor operations to verify if a nuclear reactor is producing plutonium at the expected levels. This ability means the hydrogel produced from the antineutrino detection scintillation composition may be used by domestic or international agencies (such as International Atomic Energy Agency) to detect clandestine nuclear activity or to verify the power history and fissile inventory of a nuclear reactor as a safeguard for commercial power reactors and as defense against rogue nuclear nations producing weapons grade SNM.

The hydrogels produced from the neutron detection scintillation composition or from the antineutrino detection scintillation composition may be used in conventional detection systems e.g., detectors, such as a conventional neutron detector or a conventional antineutrino detector. Such detectors include, but are not limited to, those described in U.S. Pat. No. 9,505,977 to Riddle et al., the entire disclosure of which is hereby incorporated by reference herein in its entirety. Although designs of neutron detectors vary based on the way in which the conversion material is arranged and how the neutron absorption reaction products are detected, the neutron detectors may be classified into one of three main categories: proportional, scintillator, or semiconductor detectors. The hydrogels produced from the neutron detection scintillation composition may be used in any of these types of neutron detector. The proportional detectors use a gas to amplify the charge from the original charged particles generated by a neutron absorption reaction in the hydrogels of the disclosure. The amplified charge is proportional to the original charge. A $^3$He proportional detector uses $^3$He gas as both the conversion material and for the gas amplification. Other proportional detectors use a layer of the hydrogels of the disclosure, with argon gas that provides the charge amplification. These neutron detectors are sealed gas-filled tubes with electronic connections. During use and operation of the neutron detectors, the hydrogels of the disclosure emit light when struck by an incoming particle. When the hydrogels absorbs neutrons, the resulting charged particles deposit energy. This causes the emission of light that can be converted to an electrical signal, which is measurable. The semiconductor neutron detectors include semiconductor chips with the hydrogels of the disclosure. The hydrogels may be incorporated into the chip, applied in a layer on the chip, or applied to a three-dimensional structure on the chip. These semiconductor detector types are, respectively, referred to as bulk semiconductor, coated/layered semiconductor, and three-dimensional semiconductor detectors. The charged particles from a neutron absorption reaction in the hydrogels deposit energy in the semiconductor, creating a measurable electrical signal.

The hydrogels produced from the neutron detection scintillation composition or from the antineutrino detection scintillation composition may be appropriately shaped and sized e.g., by using an appropriately shaped and sized mold or by cutting, for the particular environment in which the detection function is carried out. Since the hydrogel may be sized and shaped as desired, the hydrogel may be used in a compact PMT detector, such as a PMT detector having an active volume of about 1 $m^3$ or less. During use and operation, the resulting hydrogel may fluoresce at a wavelength range from about 290 nm to about 485 nm, which is within the energy range for gamma excitation and PMT detection. Alternatively, the hydrogel may fluoresce at a wavelength range from about 470 nm to about 640 nm, which provides between about two times higher and about three times higher light yield than is observed at a wavelength range from about 430 nm to about 450 nm. By way of example only, the hydrogel may fluoresce and be visible with ultraviolet light excitation at room temperature. The PMT detector may include an array of detectors and associated detector circuitry that is configured to feed into at least one processor. The processor includes programming that is configured to analyze received signal data. Thus, the processor is operable to provide output indicative of respective results of a material, including whether radioactive (or questionable) material has been detected.

As shown in FIG. 1, the hydrogel 104 (indicated with dashed line) may be placed in an enclosure 102 (e.g., a PMT housing) of a detector 100 configured to detect neutrons or antineutrinos. The hydrogel 104 may be one or more of the hydrogels as described above and is located in the enclosure 102. The hydrogel may be encased in a top portion 101 of the enclosure 102.

Figure 2:
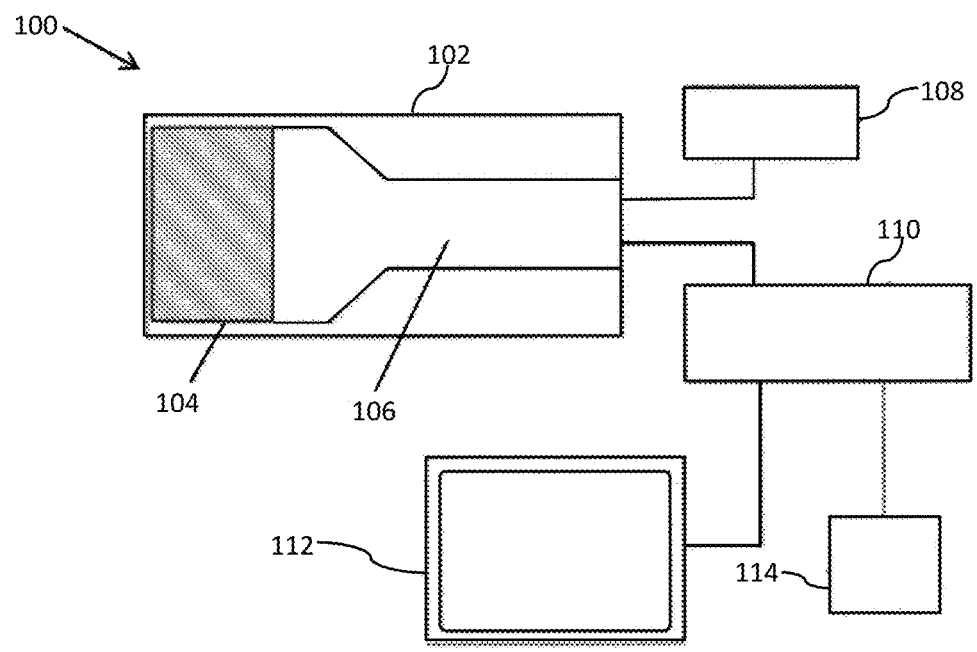
FIGS. 2 and 3 are schematic drawings of a detection system including a hydrogel according to embodiments of the disclosure and configured to detect at least one of neutrons or antineutrinos.

As shown in FIG. 2, a detector 100 including an enclosure 102, the hydrogel 104, at least one PMT tube 106, a voltage supply 108, circuitry 110, a readout device 112 (e.g., a display), and a data storage 114. The hydrogel 104 may be one or more of the hydrogels as described above and is located in the enclosure 102. FIG. 2 is a schematic representation and, for simplicity, not all detector components are shown. The circuitry 110 includes at least one processor. The processor is associated with computer programming that includes computer executable instructions in the data storage 114 that is configured to identify and analyze the actuation intensity of the scintillation compound in the hydrogel. The circuitry 110 may also include (or be in operative connection with) other components, including any of a pulse discriminator, a digital counter, a multichannel analyzer, an amplifier, and/or a coincidence circuit. The circuitry 110 enables a determination to be made on whether nuclear (e.g., radioactive) material has been detected or is present.

Figure 3:
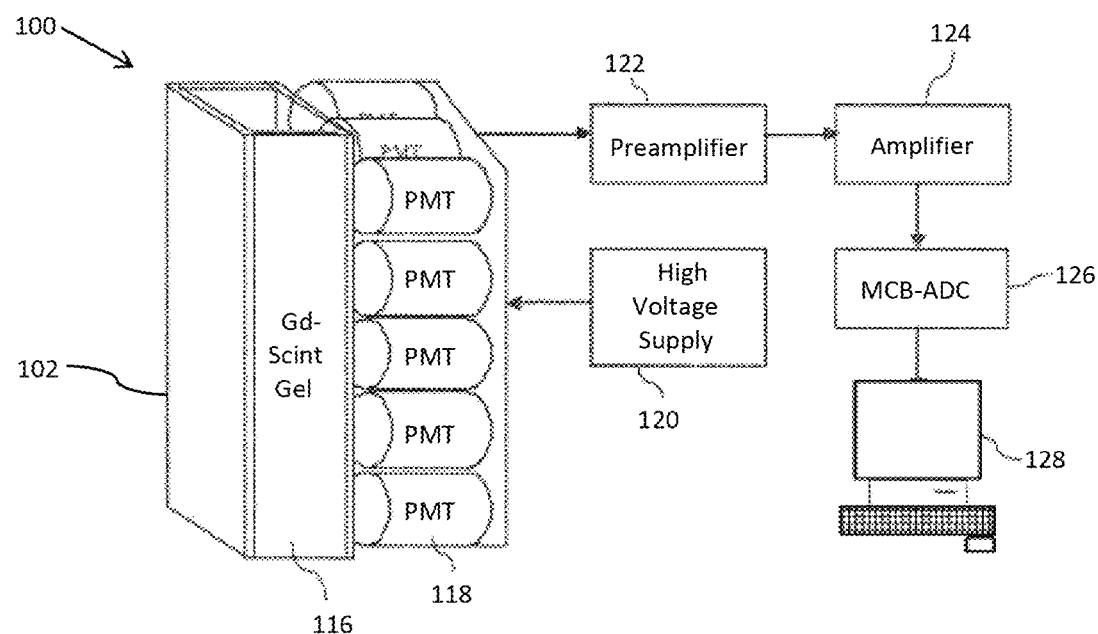

An alternative detector 100 is shown in FIG. 3 and includes the hydrogel 116 in proximity to an array of PMT tubes 118, a preamplifier 122, an amplifier 124, and a computer 128. The detector 100 also includes a power supply 120. The hydrogel 116 may be one or more of the hydrogels as described above and is located in the enclosure 102. The PMT tubes 118 are supplied with high voltage power from the power supply 120. The PMT tubes 118 are each in operative connection with a base unit that incorporates a preamplifier 122. The preamplifier 122 integrates the charge impulse from an anode of the PMT tubes 118. Signals from the preamplifier 122 are delivered to the amplifier 124. The signals from the amplifiers 124 are converted to digitized signals using a multichannel buffer (MCB) and analog-to-digital converter (ADC) generally indicated 126. The digital output signals are delivered to the computer 128, which includes circuitry (not shown) including at least one processor and at least one data store. The computer 128 operates to save the digitized outputs corresponding to the outputs from the PMT tubes 118. The digitized outputs are captured in the data store of the computer 128 and analyzed using computer programs.

The following examples serve to explain embodiments of the disclosure in more detail. These examples are not to be construed as being exhaustive or exclusive as to the scope of the disclosure.

Examples

Exemplary formulations for the scintillation compositions for neutron and antineutrino detection are shown below in Tables 1 and 2.

Exemplary neutron detection scintillation compositions are shown in Table 1, including the volume or mass of each component to produce 100 ml of the hydrogel:

TABLE 1

Formulations of Neutron Detection Scintillation Composition.

| Component | Formulation 1 (Volume/Mass for total volume of 100 mL of hydrogel) | Formulation 2 (Volume/Mass for total volume of 100 mL of hydrogel) | Formulation 3 (Volume/Mass for total volume of 100 mL of hydrogel) |
|---|---|---|---|
| 30% acrylamide/bis-acrylamide, 29:1 (3.3% crosslinker) | 47 ml | 47 ml | — |
| Ammonium persulfate | 2 ml (10% conc.) | 2 ml (10% conc.) | — |
| TEMED | 1 ml | 1 ml | — |
| Poly(N-vinylcarbazole) | — | — | 50 ml |
| Non-plasticizing silicone gel | — | — | 50 ml |
| Gd-DTPA, saturated | 5 g-10 g representing 11%-15% Gd | — | — |

TABLE 1-continued

Formulations of Neutron Detection Scintillation Composition.

| Component | Formulation 1 (Volume/Mass for total volume of 100 mL of hydrogel) | Formulation 2 (Volume/Mass for total volume of 100 mL of hydrogel) | Formulation 3 (Volume/Mass for total volume of 100 mL of hydrogel) |
|---|---|---|---|
| $Gd_2O_2S$:Tb, saturated | concentration in final gel — | 3 g-8 g representing 5%-10% Gd concentration in final gel | — |
| Gadolinium tris-tetra-methyl-heptanedionate, saturated | — | — | 3 g-8 g representing 5%-10% Gd concentration in final gel |
| Strontium diiodide [5% Eu] ($SrI_2$[Eu]), saturated | 70 mg-150 mg | 70 mg-150 mg | 70 mg-150 mg (30 ml) |
| Water (deionized nanopure) | Balance | Balance | |

Components of exemplary antineutrino detection scintillation compositions are shown in Table 2, including the volume or mass of each component to produce 100 ml of the hydrogel:

TABLE 2

Formulations of Antineutrino Detection Scintillation Compositions.

| Component | Formulation 4 (Volume/Mass for total volume of 100 mL of hydrogel) | Formulation 5 (Volume/Mass for total volume of 100 mL of hydrogel) |
|---|---|---|
| 30% acrylamide/bis-acrylamide, 29:1 (3.3% crosslinker) | 47 ml | 47 ml |
| Ammonium persulfate | 2 ml (10% conc.) | 2 ml (10% conc.) |
| TEMED | 1 ml | 1 ml |
| Gd-DTPA, saturated | 5 g-10 g representing 11%-15% Gd concentration in final gel | 5 g-10 g representing 11%-15% Gd concentration in final gel |
| (fac-tris(2-phenylpyridine)iridium ($Ir(mppy)_3$) | 65 mg-200 mg | 65 mg-200 mg |
| 2-(4-tert-butylphenyl)-5-(4-phenylphenyl)-1,3,4-oxadiazole (b-PBD) or | 80 mg-120 mg | — |
| 2,5-diphenyl oxazole (PPO) | — | 0.5 mg-1 mg |
| 1,4-bis(5-phenyloxazol-2-yl)benzene (POPOP) | — | 0.1 mg-0.5 mg |
| Risk Reactor water soluble biotracer dye | 4 ml | |
| Water (deionized nanopure) | Balance | Balance |

Figure 4:
FIGS. 4 and 5 are photographs of hydrogels according to embodiments of the disclosure.
Figure 5:

The components of each of the formulations in Tables 1 and 2 were combined to produce the scintillation compositions. All of the components of the scintillation compositions were commercially available at ACS reagent grade or higher and were used as-is. All of the components except for the acrylamide/bis-acrylamide, ammonium persulfate, and TEMED were combined with mixing, followed by addition of the acrylamide/bis-acrylamide, ammonium persulfate, and TEMED, which initiated polymerization of the scintillation compositions. As the polymerization progressed but before polymerization was complete, the scintillation compositions were poured into molds to form the desired shapes and sizes of hydrogels. After polymerization was complete, the hydrogels were removed from the molds. Photographs of the hydrogels in ambient light and ultraviolet light are shown in FIGS. 4 and 5, respectively. As shown in FIGS. 4 and 5, the hydrogels were formed into a variety of shapes and sizes. After removal from the molds, the hydrogels exhibited sufficient rigidity to maintain their shapes and exhibited sufficient mechanical strength and stability to remain intact when dropped a distance of about three feet.

Figure 6:
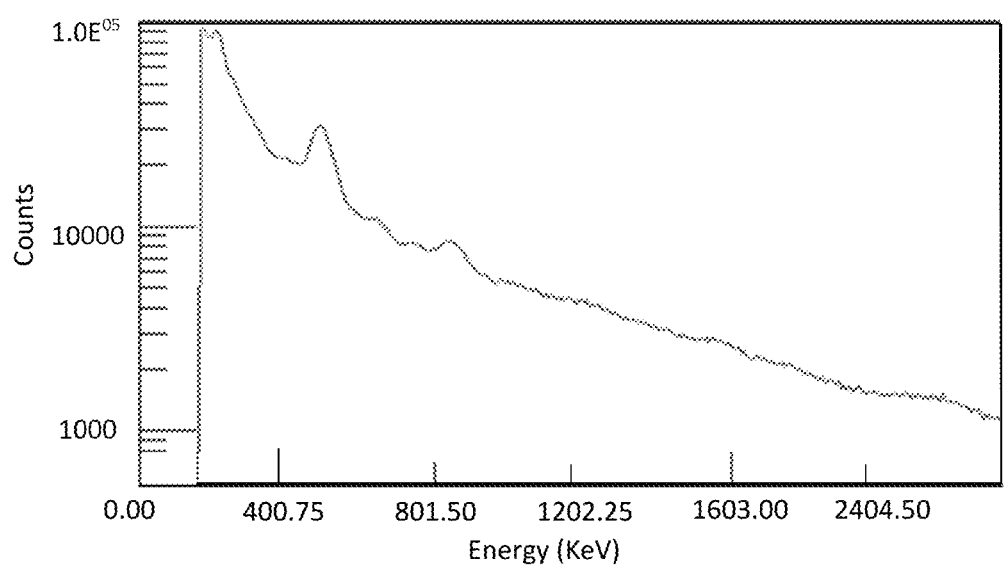
FIG. 6 is a plot showing counts as a function of energy for a hydrogel according to embodiments of the disclosure exposed to a neutron source.

A hydrogel formed from one of the formulations in Table 1 or Table 2 or a formulation including terbium-doped gadolinium oxide as the gadolinium coordination complex was observed to absorb neutrons and emit detectable light when exposed to neutrons. FIG. 6 is a plot of counts versus energy for a hydrogel formed from one of the formulations in Table 1 or Table 2 or a formulation including terbium-doped gadolinium oxide. The hydrogel was exposed to neutrons from an americium-beryllium source and exhibited an excellent response as shown in FIG. 6. The observed peaks in FIG. 6 are representative of neutron absorption and gamma ray emission, indicating that the capture response of the hydrogel is not affected by the form (e.g., shape and/or size) of the hydrogel. Therefore, the hydrogels of the disclosure are effective neutron absorbers.

While the disclosure may be susceptible to various modifications and alternative forms, specific embodiments have been shown by way of example in the Examples and drawings and have been described in detail herein. However, it should be understood that the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A hydrogel comprising:
water, a gadolinium compound, and a scintillation compound in a polymer matrix of the hydrogel, the scintillation compound comprising:
strontium diiodide, fac-tris(2-phenylpyridine)iridium (Ir(ppy)3), a quinine compound, or combinations thereof; or
2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof.

2. The hydrogel of claim 1, wherein the gadolinium compound and the scintillation compound are homogeneously dispersed in the water and the polymer matrix.

3. The hydrogel of claim 1, wherein the gadolinium compound comprises diethylenetriaminepentaacetic acid gadolinium(III) ((Gd-DTPA).xH$_2$O), gadolinium(III) nitrate (Gd(NO$_3$)$_3$.6H$_2$O), gadolinium(III) sulfate (Gd$_2$(SO$_4$)$_3$), terbium-doped gadolinium oxysulfide (Gd$_2$O$_2$S:Tb$^{3+}$), terbium-doped gadolinium oxide (Gd$_2$O$_3$:Tb$^{3+}$), gadolinium tris-tetra-methyl-heptanedionate, or combinations thereof.

4. The hydrogel of claim 1, wherein the scintillation compound comprises strontium diiodide and the gadolinium compound comprises Gd-DTPA.xH$_2$O.

5. The hydrogel of claim 1, wherein the scintillation compound comprises Ir(ppy)$_3$ and the gadolinium compound comprises Gd-DTPA.xH$_2$O.

6. The hydrogel of claim 1, wherein the scintillation compound comprises 2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof and the gadolinium compound comprises Gd-DTPA.xH$_2$O.

7. The hydrogel of claim 1, wherein the scintillation compound comprises 2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof and the gadolinium compound comprises Gd$_2$O$_3$:Tb$^{3+}$.

8. The hydrogel of claim 1, wherein:
the polymer matrix comprises polyacrylamide;
the gadolinium compound comprises diethylenetriaminepentaacetic acid gadolinium(III) or Gd$_2$O$_3$:Tb$^{3+}$; and
the scintillation compound comprises strontium diiodide homogeneously dispersed in polyacrylamide.

9. The hydrogel of claim 1, wherein:
the polymer matrix comprises polyacrylamide;
the gadolinium compound comprises diethylenetriaminepentaacetic acid gadolinium(III) or Gd$_2$O$_3$:Tb$^{3+}$; and
the scintillation compound comprises 2-(4-biphenylyl)-5 phenyl-1,3,4-oxadiazole (PBD), 2-(4-tert-butylphenyl)-5-(4-phenylphenyl)-1,3,4-oxadiazole (butyl-PBD), 2,5-diphenyl oxazole (PPO), 1,4-bis(5-phenyloxazol-2-yl) benzene (POPOP), or combinations thereof homogeneously dispersed in polyacrylamide.

10. The hydrogel of claim 1, wherein the hydrogel is rigid and substantially maintains its shape.

11. A detection system comprising:
an enclosure, at least one photomultiplier tube, and a hydrogel in proximity to the at least one photomultiplier tube, the hydrogel of the detection system configured to detect neutron or antineutrino radiation, the hydrogel comprising:
water, a gadolinium compound, and a scintillation compound homogeneously dispersed in a polymer matrix, the scintillation compound comprising:
strontium diiodide, fac-tris(2-phenylpyridine) iridium (Ir(ppy)3), a quinine compound, or combinations thereof; or
2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof.

12. The detection system of claim 11, wherein the detection system has an active volume of about 1 m$^3$ or less.

13. A method of detecting radiation emitting from an article, comprising:
interacting neutrons or antineutrinos emitted from an article with a hydrogel of a detection system, the hydrogel comprising:
water, a gadolinium compound, and a scintillation compound homogeneously dispersed in a polymer matrix, the scintillation compound comprising:
strontium diiodide, fac-tris(2-phenylpyridine) iridium (Ir(ppy)$_3$), a quinine compound, or combinations thereof; or
2-(4-biphenylyl)-5 phenyl-1,3,4-oxadiazole (PBD), 2-(4-tert-butylphenyl)-5-(4-phenylphenyl)-1,3,4-oxadiazole (b-PBD), 2,5-diphenyl oxazole (PPO), 1,4-bis(5-phenyloxazol-2-yl) benzene (POPOP), or combinations thereof; and
detecting the neutrons or antineutrinos.

* * * * *

UNITED STATES PATENT AND TRADEMARK OFFICE
CERTIFICATE OF CORRECTION

PATENT NO. : 10,703,968 B2
APPLICATION NO. : 15/890837
DATED : July 7, 2020
INVENTOR(S) : Catherine Lynn Riddle et al.

Page 1 of 1

It is certified that error appears in the above-identified patent and that said Letters Patent is hereby corrected as shown below:

On the Title Page

In ITEM (60)   Lines 1 and 2,   change "filed on Feb. 28, 2017." to
--filed on Feb. 8, 2017.--

Signed and Sealed this
Sixth Day of October, 2020

Andrei Iancu
*Director of the United States Patent and Trademark Office*